S. W. WOODHULL.
OPTICAL CABINET.
APPLICATION FILED JUNE 9, 1919.
1,353,372.
Patented Sept. 21, 1920.
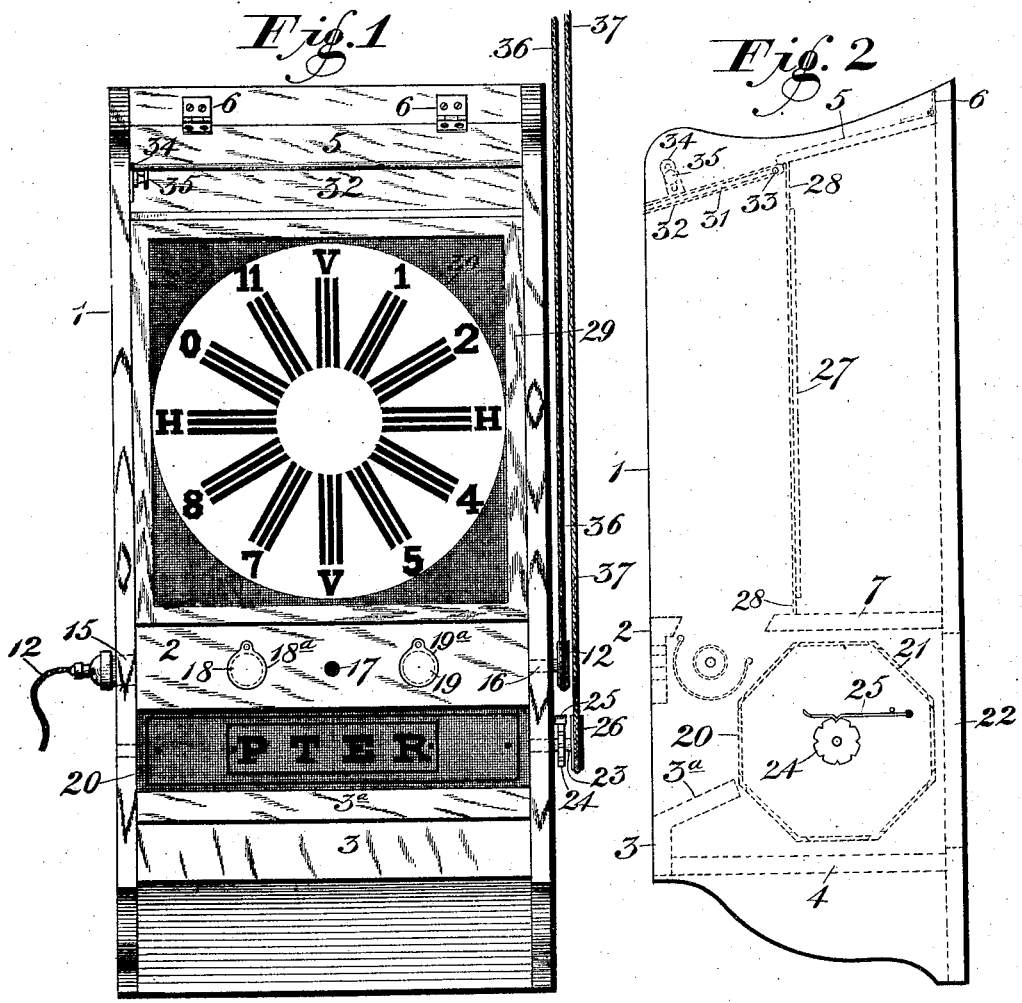
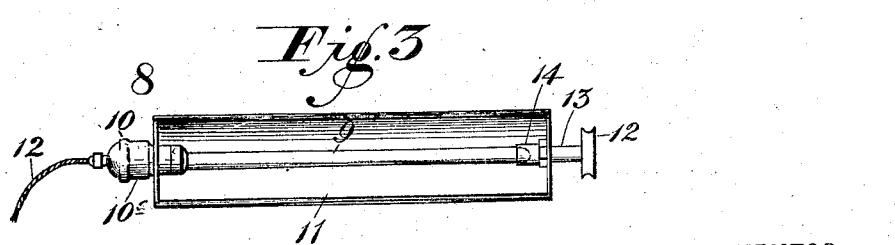
INVENTOR.
S. W. Woodhull
BY E. E. Overholt,
ATTORNEY.

UNITED STATES PATENT OFFICE.

SERENO W. WOODHULL, OF NEWPORT, RHODE ISLAND.

OPTICAL CABINET.

1,353,372.  Specification of Letters Patent.  Patented Sept. 21, 1920.

Application filed June 9, 1919. Serial No. 302,835.

*To all whom it may concern:*

Be it known that I, SERENO W. WOODHULL, a citizen of the United States, residing at Newport, in the county of Newport and State of Rhode Island, have invented certain new and useful Improvements in Optical Cabinets, of which the following is a specification.

My invention relates to optical cabinets for use by optometrists in making the various tests of eyes necessary to determine the kind of eye glasses needed.

The object is to provide a device of this character, of neat and compact construction, adapted to give astigmatic tests, muscle tests, color tests, reading tests, etc., and to do so by the use of a single light, so arranged that when the light is thrown upon any one of the testing devices it is cut off from all the others.

Other objects will appear in the subjoined description.

A leading feature of the invention consists in a cabinet adapted to receive and to expose to view various testing devices for the eyes, in combination with a light and coöperating screen located in suitable proximity to said devices, and adjustable to different positions to throw the light upon said testing devices, one at a time, and while throwing the light upon any one of the devices, to cut it off, or screen it, from all the others.

The invention consists in certain novel features of construction and arrangement of parts, as will be hereinafter described and claimed, reference being had to the accompanying drawings, in which, Figure 1 is a front elevation of my improvement, with the astigmatic dial inserted ready to make a test for astigmatism.

Fig. 2 is a side elevation of Fig. 1, with the operating bands and wheels removed for clearness: and with the arrangement of certain parts inside the cabinet indicated in dotted lines; and, Fig. 3 is a plan view of the light and screen therefor.

The numeral 1 indicates the cabinet, which is, for the most part, open on the front side, but is provided on said side with the narrow panels 2 and 3, the latter being at the lower front side of the cabinet.

The cabinet is also provided with the bottom 4, and a lid 5 at the top hinged to the back of the cabinet by the hinges 6; and a partial horizontal partition 7 located in the rear of the cabinet, in the same plane with the top of the panel 2.

Immediately behind the panel 2 is the lighting arrangement 8 more fully illustrated in Fig. 3, which arrangement consists of the bulb 9 carried by the electric light socket 10 and supported in a reflector or screen 11, said socket having a cord 12 for connection with the electric supply.

The screen or reflector 11 is provided with an opening in one of its ends for the easy reception of the light socket 10, and at its other end has a band wheel 12 carried on a shaft 13 which is screw threaded at its inner end for removable connection with the screen or reflector 11. The reflector 11 is also provided on its edges with curved lips $11^a$, and on the inner side of its end adjacent the band wheel 12 with a short tube adapted to loosely receive the inner end of the bulb 9 to support the same in the reflector.

The enlarged portion $10^a$ of the light socket is snugly received into an opening 15 (shown in dotted lines) in the side of the cabinet, so that the socket 10 carrying the bulb 9 is usually preferably held against rotation in the cabinet. The stem 13 at the other end of the reflector is rotatably received into an opening 16 shown in dotted lines in the side of the cabinet, and as this stem is rigidly connected with the reflector 11, it follows that when the wheel 12 is rotated, the reflector is rotated around the bulb 9.

The panel 2 is provided at its center with a diminutive opening 17, and on opposite sides of this opening and in alinement therewith are two other larger openings 18 and 19, shown in dotted lines. These last two openings are provided on the outside of the panel with swinging covers, and are also covered at the inside of the panel with colored glass, preferably let into the panel flush with the inner face thereof. The glass used with the opening 18 is usually red, and that used with the opening 19 green.

The lower portion of the cabinet is provided with an octagonal drum 20 which may be formed of wood or tin. This drum is clearly illustrated in dotted lines in Fig. 2 of the drawings, and its faces are provided with grooves or recesses 21 for receiving and holding the cards containing the single lines of test letters. The cards are inserted into these grooves or recesses from the rear side of the cabinet through a door or opening 22 shown in dotted lines in Fig. 2.

The drum 20 is mounted on an axle 23 having bearings in opposite sides of the cabinet. At the right end of this axle on the outside of the cabinet is a notched wheel 24 having a coöperating spring pawl 25 for engaging said notches as the wheel is rotated, the notches and pawl being so constructed that the wheel may be rotated either backward or forward, and are so arranged and related to each other and to the faces of the octagon that whenever one of the notches is engaged by the pawl, one of the faces of the octagon will be in a vertical position facing forwardly.

On the outer end of the drum axle 23 is a band wheel 26.

The upper portion of the cabinet is provided with a test card 27 (shown in dotted lines in Fig. 2) containing different sizes of type, and adapted to remain permanently in the cabinet. The cabinet is provided on opposite sides in front of the test card 27, with vertical grooves 28 adapted to removably receive the frame 29 carrying the astigmatic dial 30, so that that dial can be set into the cabinet in front of the test type card 27, as shown in Fig. 1, whenever it is desired to make a test for astigmatism.

The frame 29 is also provided with suitable grooves for the easy insertion or removal of the astigmatic dial, or of any other dial or test card that it may be desirable to use.

The upper portion of the cabinet near its top and in front of the test type card and astigmatic dial, is provided with a mirror 31 mounted in a frame 32, hinged at 33, said frame having an upwardly extending slotted lug 34 coöperating with a setscrew 35, whereby the mirror 31 may be set in adjusted positions to suitably reflect the light from the bulb 9 upon the astigmatic dial to evenly illuminate the face of said dial.

The panel 3 at the lower front side of the cabinet is provided at its upper edge with an inwardly inclined section 3ª extending into close proximity to the octagonal drum 20, the space between the panel section 3ª and the panel 2 being of only sufficient width to expose the faces of the octagonal drum to view, one at a time.

The band wheels 12 and 26 are provided with bands 36 and 37 respectively, which bands may be passed over suitable shives or guideways (not shown) to lead to any point from which the optometrist may desire to operate the device. When desired, the device may, of course, be operated by simply taking hold of the wheels 12 and 26 between the thumb and finger and suitably rotating them.

The shaft 13 may, if desired, be also provided with a pawl and ratchet arrangement like the shaft 23, to cause it to stop in exact predetermined positions.

In assembling the parts of my device, the reflector or screen 11 is placed in the cabinet, and the light bulb 9 is passed through the side of the cabinet into it, with the extreme forward end of said bulb received into the short tube 14. The shaft 13 carrying the band wheel 12 is passed through the other side of the cabinet and screwed into rigid engagement with the other end of the reflector in alinement with the short tube 14. The octagonal drum 20 is passed into the cabinet through the door 22 at the rear side thereof. This door also provides a convenient means for the insertion and removal of the single line test cards carried upon the faces of the drum. By raising the door 5, the frame 29 carrying the astigmatic dial 30 may be passed down into the cabinet through the vertical grooves 28 in the opposite sides thereof, in front of the test type card 27 which is permanently located just in the rear of said grooves 28. When the astigmatic dial is removed, the test type card is of course exposed to view, or, seen in its place, so to speak.

As to the operation of my device, it is only necessary to add to the foregoing that when the wheel 12 is rotated, the reflector or screen 11 rotates with it around the bulb 9, causing the light from said bulb to always shine only in the direction of the open side of the reflector, and screening or cutting it off from shining in any other direction; so that when it is desired to make a muscle test through the diminutive opening 17 in the panel 2, or a color test through the larger openings 18 and 19 in said panel, the reflector is turned with its open side facing forwardly, thus permitting the light from the bulb to shine directly out through said openings. To display the color tests one at a time when desired, the swinging covers 18ª and 19ª are suitably removed from over their respective openings. When it is desired to use the astigmatic dial 30 or the test type card 27, the reflector 11 is turned in the position illustrated in Fig. 2 with its open side toward said parts, in which position the light from the bulb will also fall upon the mirror 31 at the top of the cabinet, and by means of the lug 34 and the set screw 35 the mirror can be adjusted to evenly distribute the light over the face of whichever one of said parts is being used. When it is desired to throw the light upon the single line test cards carried by the octagonal drum, the reflector is turned till its open side faces toward the forward face of the drum, which will cause the light to shine brightly upon this face, so that according to the illustration in Fig. 1, the letters P T E R would be clearly displayed.

In this connection, special attention is called to the fact that the parts of my apparatus are all so arranged relatively to each other that when the light is thrown upon any one of the testing devices it is cut off from the others, so that the member 11 while serving admirably as a reflector, may also at the same time be equally well designed as a screen for the light.

Having now described my invention, what I claim as new and desire to secure by Letters Patent is:—

1. In a device of the character described, a cabinet having testing devices for the eyes; a light in proximity to said devices; and means for directing the light toward any desired one of said devices while screening it from shining on the others.

2. In a device of the character described, a cabinet having testing devices for the eyes; a light intermediate said devices; and a screen having an open side adapted to rotate around said light, to direct the light on any desired one of said devices while simultaneously screening it from shining on the others.

3. In a device of the character described, a cabinet having a light; testing devices for the eyes in front of said light and above the same rearwardly thereof; means for directing the light toward either one of said testing devices as may be desired; and an adjustable mirror for coöperating with the light when the same is directed upwardly and rearwardly toward said upper testing device to evenly distribute the light over the same, said mirror being above said testing device.

4. A device of the character described, comprising testing devices for the eyes; means for holding said devices in position to be seen; a light supported adjacent said devices; means for turning the light on any desired one of said devices and for simultaneously therewith cutting it off from the others.

5. In a device of the character described, a cabinet having a light; testing devices for the eyes in front of said light and at the side thereof; means for directing the light toward either one of said testing devices as may be desired; and an adjustable mirror for coöperating with the light when the same is directed toward said testing device at the side of said light, said mirror and light being at opposite sides of said latter testing device, whereby to evenly distribute the light over the same.

6. In a device of the character described, a cabinet having a light; testing devices for the eyes in front of said light and above and below the same at the rear thereof; means for directing the light toward any one of said testing devices and for simultaneously therewith screening it from the others.

7. In a device of the character described, a cabinet having testing devices for the eyes; a light intermediate said devices, one of said devices comprising a rotatable drum at one side of said light to the rear thereof, and adapted to carry test cards spaced from each other around the drum; and a screen, having an open side, adapted to rotate around said light to cause the light to shine in any one direction desired while screening it from shining in any other direction.

8. In a device of the character described, a cabinet having an elongated horizontal light therein; testing devices for the eyes in front of said light and above and below the same at the rear thereof, the lower testing devices being on a rotatable drum; a horizontal screen, having an open side, adapted to rotate around said light to screen any desired one of said devices from the light at the will of the operator; and an adjustable mirror above the upper one of said testing devices adapted to coöperate with the light to evenly distribute light over said upper testing device.

In testimony whereof I affix my signature.

SERENO W. WOODHULL.